United States Patent
Ben-Mansour et al.

(10) Patent No.: US 8,869,599 B2
(45) Date of Patent: Oct. 28, 2014

(54) LEAK DETECTION SYSTEM BASED ON FORCE TRANSDUCTION

(75) Inventors: Rached Ben-Mansour, Dhahran (SA); Dimitrios Chatzigeorgiou, Somerville, MA (US); Atia Khalifa, Dhahran (SA); Changrak Choi, Cambridge, MA (US); Kamal Youcef-Toumi, Cambridge, MA (US)

(73) Assignees: Massachusetts Institute of Technology, Cambridge, MA (US); King Fahd University of Petroleum & Minerals, Dhahran (SA)

( * ) Notice: Subject to any disclaimer, the term of this patent is extended or adjusted under 35 U.S.C. 154(b) by 399 days.

(21) Appl. No.: 13/355,659

(22) Filed: Jan. 23, 2012

(65) Prior Publication Data

US 2013/0186181 A1    Jul. 25, 2013

(51) Int. Cl.
*G01M 3/28* (2006.01)
*G01M 3/18* (2006.01)

(52) U.S. Cl.
CPC ............ *G01M 3/2823* (2013.01); *G01M 3/182* (2013.01)
USPC ........................................................ 73/49.5

(58) Field of Classification Search
CPC ... G01M 3/28; G01M 3/2807; G01M 3/2815; G01M 3/223; G01M 3/183; G01M 3/243; G01M 3/2823; G01M 3/283; G01M 3/3263
USPC .................................................... 73/40–49.8
See application file for complete search history.

(56) References Cited

U.S. PATENT DOCUMENTS

| | | | |
|---|---|---|---|
| 2,801,409 A | | 7/1957 | Sperling |
| 3,024,651 A | * | 3/1962 | McGlasson ................. 73/152.57 |
| 3,195,235 A | | 7/1965 | Green et al. |
| 3,508,433 A | * | 4/1970 | Bustin ........................ 73/40.5 A |
| 3,524,342 A | | 8/1970 | Hobbs |
| 3,691,819 A | | 9/1972 | Guest |
| 3,859,845 A | * | 1/1975 | Sawyer .......................... 73/49.2 |
| 4,402,213 A | * | 9/1983 | Hogan ........................ 73/40.5 R |
| 4,894,539 A | * | 1/1990 | Hurst ............................. 250/303 |
| 4,984,322 A | * | 1/1991 | Cho et al. .................. 15/104.061 |
| 4,988,210 A | * | 1/1991 | Koshihara et al. ................. 374/5 |
| 4,996,879 A | | 3/1991 | Kruka et al. |
| 5,442,951 A | * | 8/1995 | Gollner et al. ............. 73/40.5 R |

(Continued)

FOREIGN PATENT DOCUMENTS

| CA | 2621035 A1 | 4/2007 |
|---|---|---|
| GB | 2364126 A | 1/2002 |
| WO | 2004031719 A1 | 4/2004 |

OTHER PUBLICATIONS

IRIN, News website, www.osisoft.com, Oct. 2007.

(Continued)

*Primary Examiner* — David A Rogers
(74) *Attorney, Agent, or Firm* — Sam Pasternack; MIT Technology Licensing Office (57) ABSTRACT

Leak detection system. A rigid body is resiliently supported within an outer cage. Structure is provided for detecting displacement of the rigid body with respect to the outer cage, the displacement indicating a leak when the rigid body is moved by a suction force generated by a local pressure gradient resulting from a leak within a pipe network. The invention allows a leak to be determined around the circumference of a pipe.

13 Claims, 9 Drawing Sheets

(56) References Cited

U.S. PATENT DOCUMENTS

| | | | |
|---|---|---|---|
| 5,675,506 A | 10/1997 | Savic | |
| 5,974,862 A | 11/1999 | Lander et al. | |
| 6,102,617 A | 8/2000 | Hampton | |
| 6,381,797 B1 * | 5/2002 | Filippovitch et al. | 15/104.061 |
| 6,401,525 B1 * | 6/2002 | Jamieson | 73/40.5 R |
| 6,530,263 B1 | 3/2003 | Chana | |
| 6,826,948 B1 | 12/2004 | Bhatti et al. | |
| 7,143,659 B2 * | 12/2006 | Stout et al. | 73/865.8 |
| 7,178,418 B2 * | 2/2007 | Richter et al. | 73/866.5 |
| 7,231,812 B1 * | 6/2007 | Lagare | 73/40.5 R |
| 7,523,666 B2 * | 4/2009 | Thompson et al. | 73/592 |
| 2002/0124633 A1 | 9/2002 | Yang et al. | |
| 2002/0134140 A1 | 9/2002 | Baumoel | |
| 2003/0167847 A1 | 9/2003 | Brown et al. | |
| 2004/0128034 A1 | 7/2004 | Lenker et al. | |
| 2004/0237632 A1 * | 12/2004 | Van Keeken | 73/46 |
| 2005/0246112 A1 | 11/2005 | Abhulimen et al. | |
| 2006/0137090 A1 | 6/2006 | Jeffries et al. | |
| 2006/0174707 A1 | 8/2006 | Zhang | |
| 2007/0051165 A1 | 3/2007 | Maresca, Jr. et al. | |
| 2008/0066812 A1 | 3/2008 | Tornay | |
| 2008/0133063 A1 | 6/2008 | Bisson et al. | |
| 2010/0269941 A1 * | 10/2010 | Hara | 138/97 |

OTHER PUBLICATIONS

Hunaidi, O. and Chu, W.T., 1999, "Acoustical Characteristics of Leak Signals in Plastic Distribution Pipes", Applied Acoustics. 58:235-254.

Kurtz, D.W., 2006. Pure Technologies US Inc., Central Regional Office, 7107, Lavendale Avenue. Dallas, TX, 2006.

Yang, J., Wen, Y. and Li, P., 2008, Leak location using blind system identification in water distribution pipelines, Journal of sound and vibration, 310 (1-2): 134-148.

The International Search report and Written Opinion issued in Connection with International Patent Application No. PCT/US2013/021549 mailed on Mar. 19, 2013.

\* cited by examiner

LEAK DETECTION SYSTEM BASED ON FORCE TRANSDUCTION

BACKGROUND OF THE INVENTION

This invention relates to leak detection in a pipe, and more particularly to a leak detection system that is based on displacement of structure under suction pressure resulting from a leak.

Considerable research and development (R&D) efforts are exerted around the world to develop technologies to detect water leaks in water distribution networks. Water leakage can reach 30% on average of the water transported across the water distribution networks [1, 2]. Current leak detection methods [3] include leak noise correlators, surface listening devices, ground penetrating radars, infrared thermography, and chemical tracing. These methods have many limitations when applied to actual water distribution networks. They can be expensive, time consuming, inaccurate, have noise interference problems, and depend on pipe material.

Acoustic and noise correlators [4, 5] are the widely used methods at the present time by water municipalities worldwide. These methods work well in metal pipes; however, the effectiveness of the method is diminished in plastic pipes due to high signal attenuation, low frequency content, and the pronounced effect of fittings on the wave propagation. Recently, leak detection using in-pipe moving sensors, like Sahara and Smartball systems, is considered to overcome many shortcomings of the conventional acoustic leak detection devices. The motivation for venturing into this technique stems from the ability to survey a long distance pipeline in a network, and surveying portions of the network which may be logistically difficult to access by other techniques. The closeness of the sensor to the leak location may enable capturing clean signals so leak detection and localization becomes more independent of pipe material, pipe depth, soil type, background noise, and other environmental effects.

Recently Atia et al [6] have proposed a leak detection method based on a pressure suction method which was first discovered using numerical techniques [7] and later experimentally verified by the same group. However, the method requires a large number (more than 20 for a 2 mm leak size) of pressure transducers or equivalent sensors in order to detect the leak. This requirement is mainly due to the fact that the pressure gradient caused by the leak is highly localized and its effect can only be sensed 1-2 leak diameters around the leak center.

It is therefore an object of the invention to provide a novel leak detection system that reduces considerably the number of sensors to a small number (3 to 5) and is capable of detecting a leak irrespective of its position around a pipe circumference. By reducing the number of sensors, the overall system cost is lower, reliability improves, and the amount of data to be processed is reduced as is the amount of power consumed.

SUMMARY OF THE INVENTION

In a first aspect, the leak (of a fluid gas or liquid) detection system according to the invention includes a rigid body resiliently supported within an outer cage. Means are provided for detecting displacement of the rigid body with respect to the outer cage. This displacement indicates a leak when the rigid body is moved by a suction force generated by a local pressure gradient resulting from a leak within a pipe network. In this embodiment, the rigid body is supported with respect to the outer cage by leaf springs. Springs may include transducers responsive to leaf spring deflection thereby producing a signal proportional to the rigid body motion with respect to the outer cage. Suitable transducers are strain gauges. Other displacement sensors can be used as well.

Under the above embodiment, means can be provided for constraining the rigid body for radial motion only with respect to the outer cage. The means for constraining the rigid body for radial motion only may include a pin and groove arrangement. The locomotion device may be supported by wheels in contact with an inner surface of a pipe within the pipe network.

In a preferred embodiment, the outer cage is supported for axial motion along a pipe in a fluid distribution network. In this embodiment of the invention, the outer cage is supported by a locomotive device for moving the cage along the pipe network.

In the latter embodiment, the leak detection system disclosed herein includes structure supported for travel along a pipe in an axial direction. A flexible leaf supported by the structure is provided, and is attached to a force sensor. A suction pressure resulting from a leak in the pipe will cause the leaf to contact the pipe wall generating a friction force on the leaf that is detected by the force sensor. The suction force can be significantly augmented by the addition of pressure-encapsulating suction cups.

DESCRIPTION OF THE PREFERRED EMBODIMENT

Figure 1A:
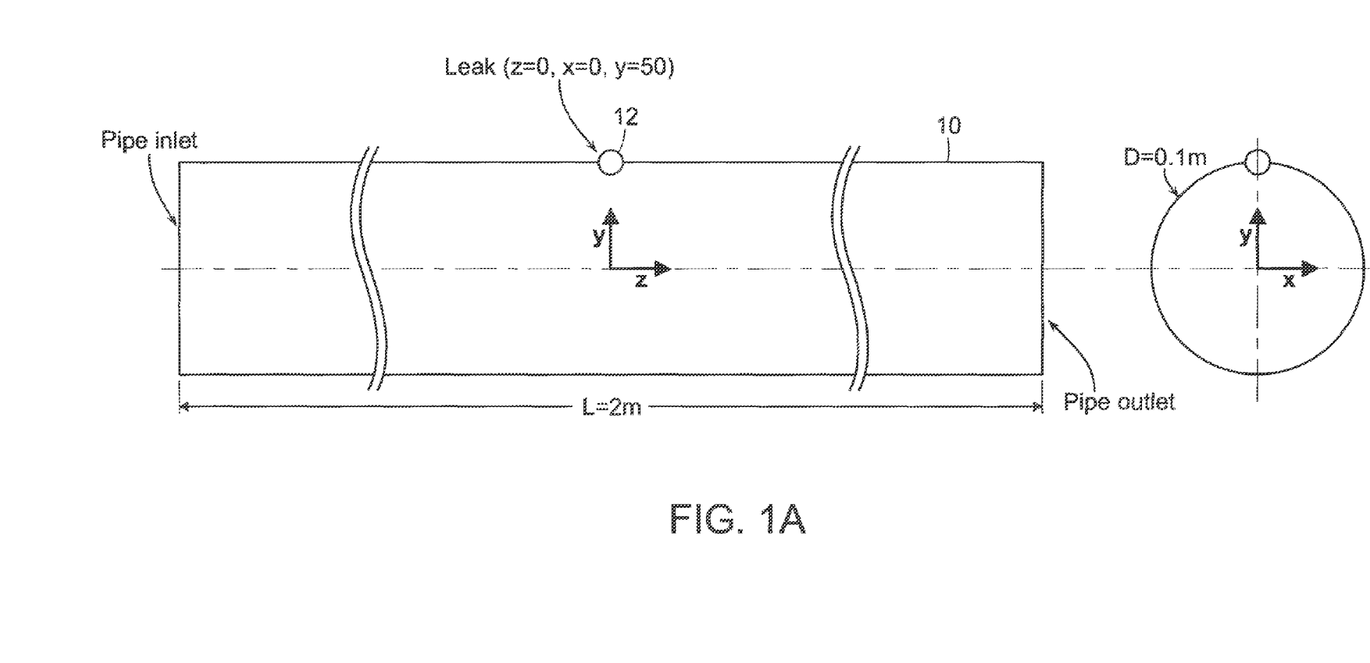
FIG. 1a is a schematic illustration of a pipe section with a rectangular leak of size 1 by 1 mm and having a line pressure of one bar and an in pipe flow velocity of 1 m/s.
Figure 1B:
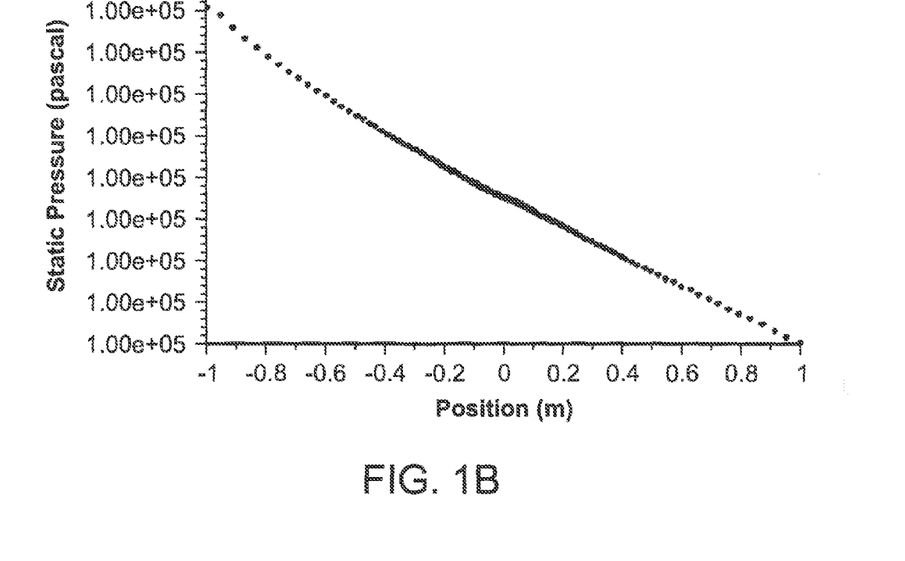
FIG. 1b is a graph of static pressure versus position showing pressure variation along the pipe.
Figure 1C:
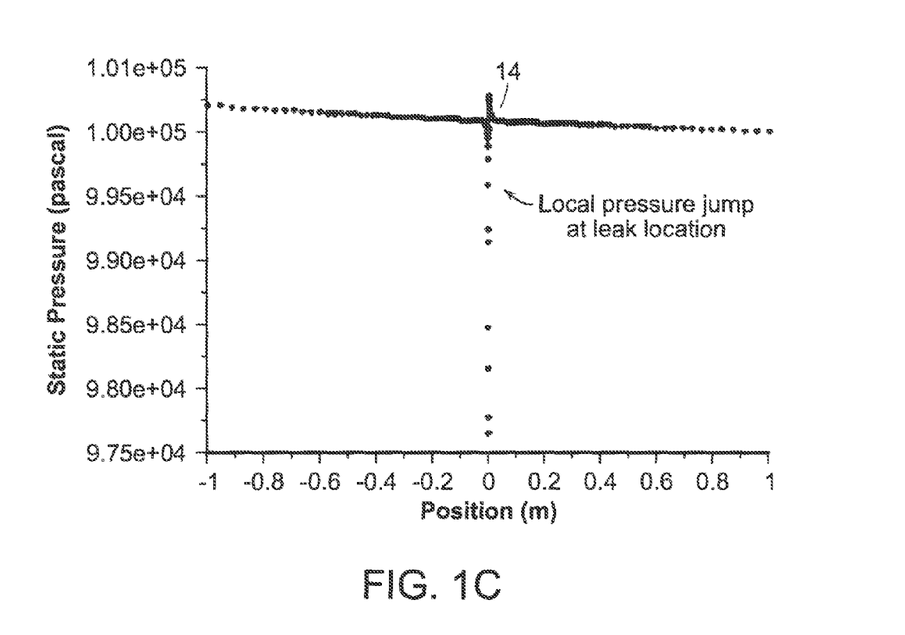
FIG. 1c is a graph of static pressure versus position along a line parallel to a centerline of the pipe at 1 mm from the pipe wall.

With reference first to FIG. 1, FIG. 1a shows a pipe 10 with a leak 12 in the pipe 10 wall. FIGS. 1b and 1c show pressure variation along the axial direction of the pipe. FIG. 1b shows the pressure variation along the pipe centerline whereas FIG. 1c shows pressure variation along a line parallel to the centerline and one millimeter from the pipe wall. Note a pressure jump 14 as shown in FIG. 1c. These figures thus show that the pressure variation is very localized in the vicinity of the leak 12.

The present method transforms a high pressure gradient in the vicinity of a leak position such as the leak 12 in FIG. 1a into a force and consequently into a displacement that can be sensed by a small number of transducers (strain gauges, load cells, piezoelectric transducers, etc.) which are optimally located. The transformation of suction pressure (gradient) created by a leak into a force is accomplished by the use of a rigid body, referred to as a suction drum, that is suspended by force transducers with respect to an outer cage.

Figure 2:
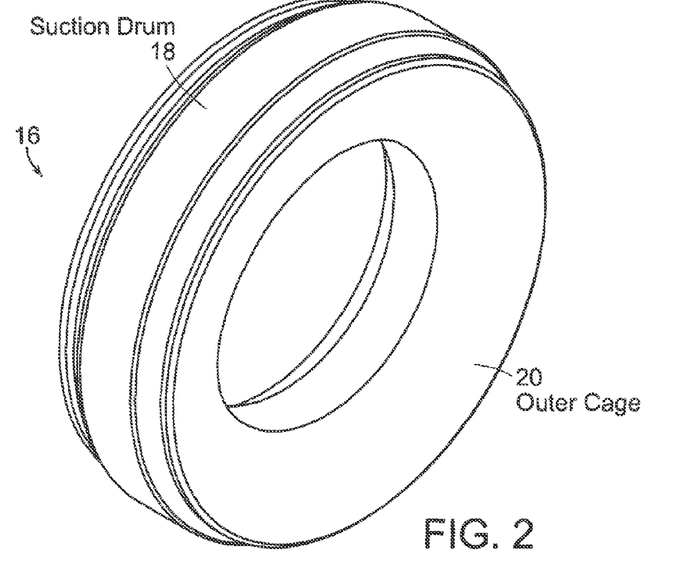
FIG. 2 is a perspective view of an embodiment of the invention showing a suction drum associated with an outer cage.
Figure 3:
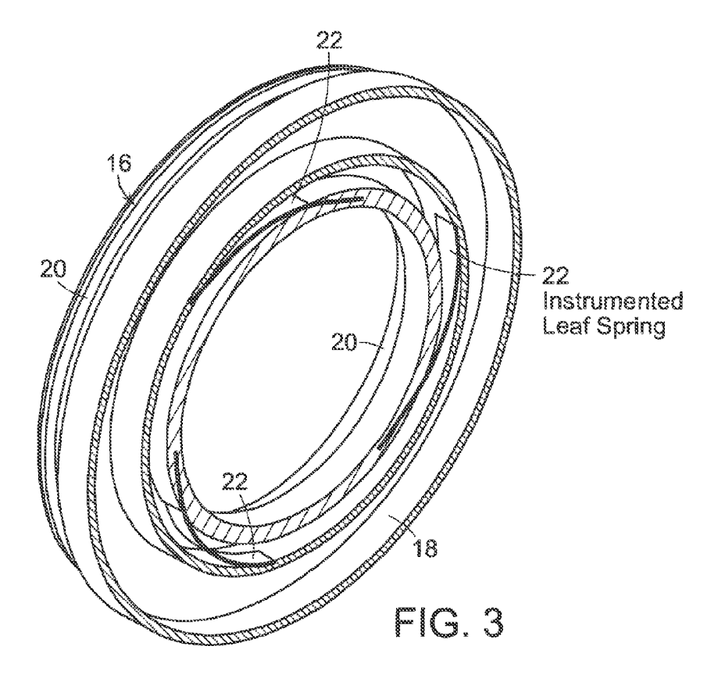
FIG. 3 is a perspective, cross-sectional cut of the embodiment shown in FIG. 1.

With reference now to FIGS. 2 and 3, leak detection structure 16 includes a suction drum 18 resiliently strained with respect to an outer cage 20. As shown in FIG. 3 the suction drum 18 is supported with respect to the outer cage 20 by leaf springs 22. In the embodiment illustrated in FIG. 3 there are three leaf springs 22. It is preferred that the leaf springs 22 include a force transducer (not shown) such as a strain gauge whose output is proportional to deflection of the leaf springs 22. Those of ordinary skill in the art will recognize that signals from the three instrumented leaf springs 22 can determine the amount and direction of motion of the suction drum 18 with respect to the outer cage 20. An appropriate algorithm processes data from the instrumented sensors to indicate the exact position of the leak around the circumference of a pipe.

Figure 4:
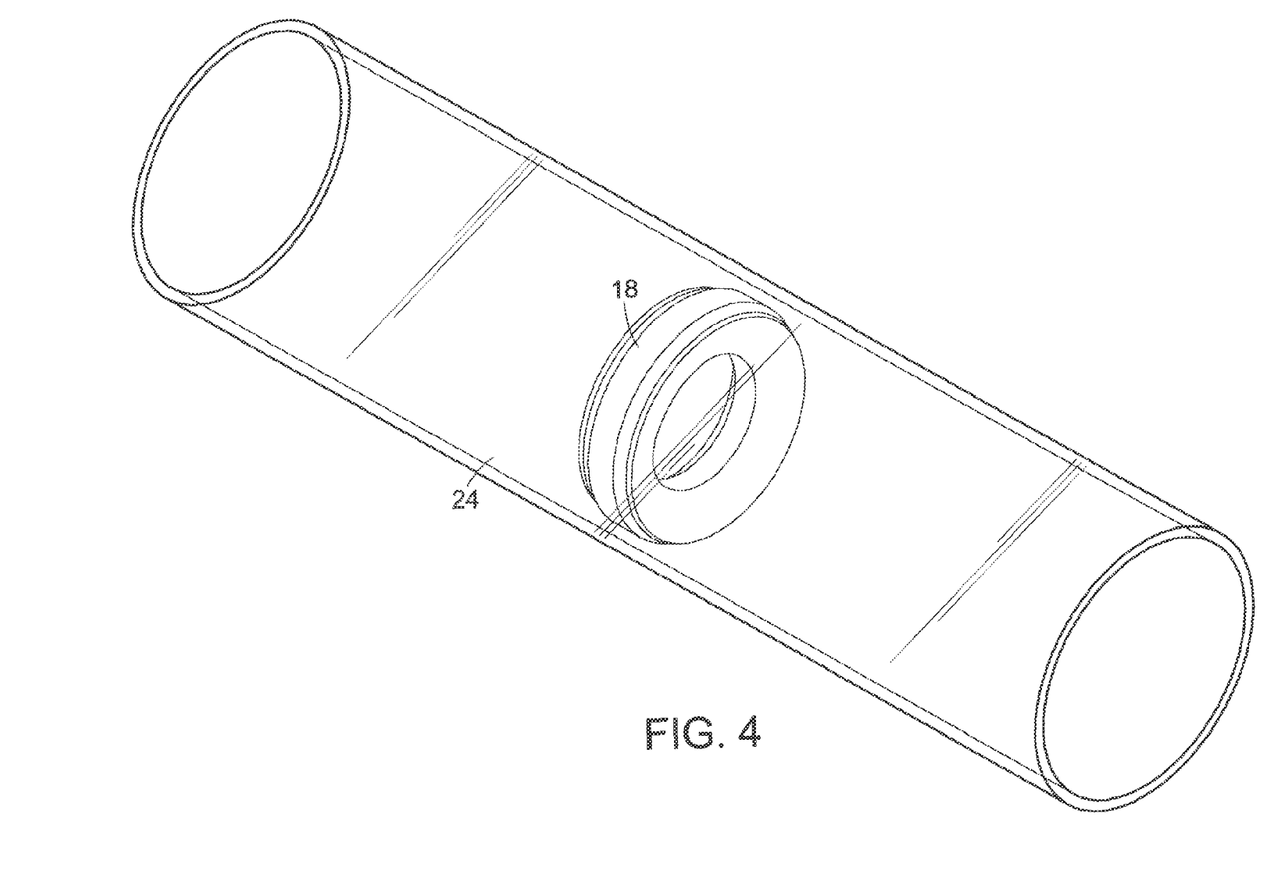
FIG. 4 is a perspective illustration of the leaf detection structure located inside a four-inch pipe.

It is preferable that the suction drum 18 be constrained to move with respect to the outer cage 20 only in a radial direction. Radial-only motion can be achieved by, for example, a pin and groove arrangement. This arrangement will also ensure a minimum clearance between the suction drum 18 and pipe walls 24 as shown in FIG. 4. The arrangement assures that there will be a minimum clearance between the suction drum 18 and the pipe wall 24. Preventing contact will inhibit the drum 18 from getting stuck within the pipe wall 24.

Figure 5:
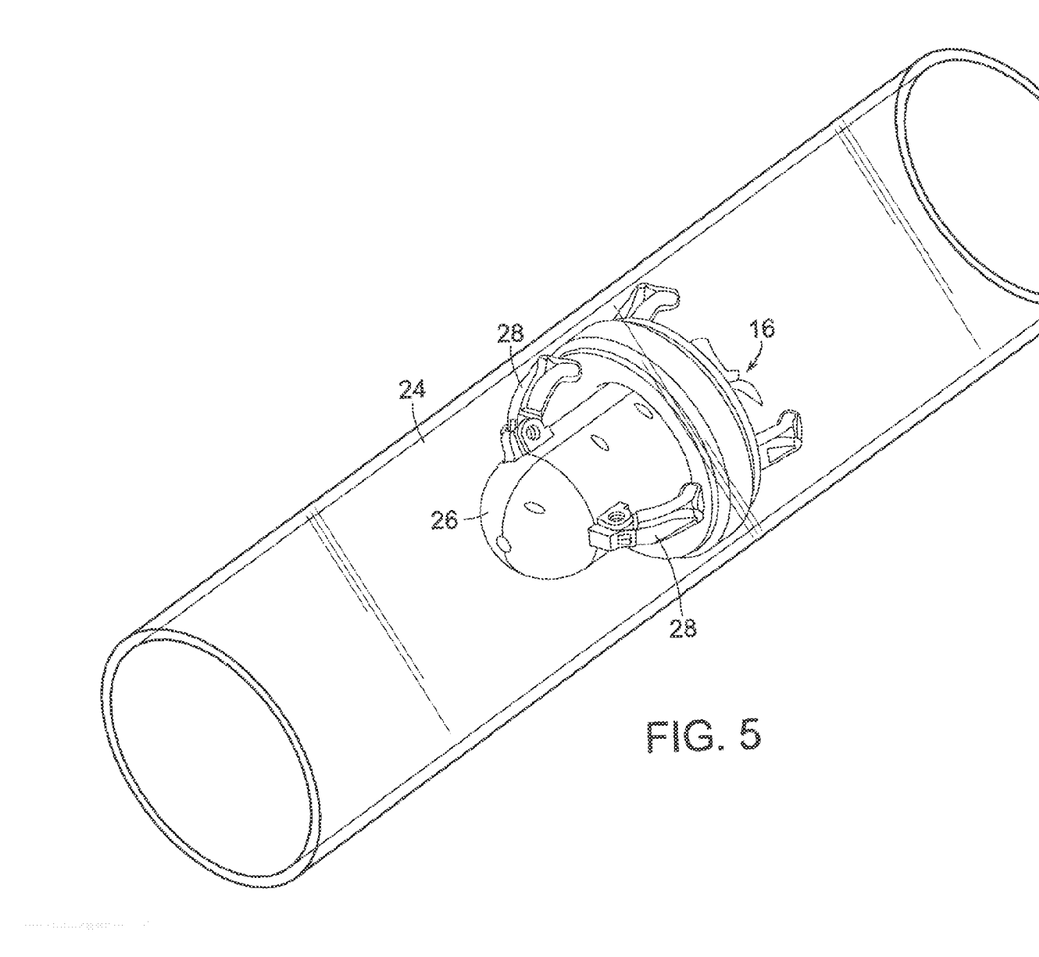
FIG. 5 is a perspective view of an embodiment of the invention disclosed herein showing the leak detection structure being propelled by a locomotive.

With reference now to FIG. 5 a locomotive 26 transports the leak detection system 16 along the inside of the pipe wall 24. The locomotive 26 includes guides 28 that maintain the system position within the pipe. The locomotive 26 or other parts of the system carry necessary electronics and equipment for data storage/processing and communication.

The operation of the system disclosed herein will now be described. As the leak detection structure 16 moves along a pipe, a pressure gradient resulting from a leak will generate a suction force on the suction drum 18 thereby moving it radially with respect to the outer cage 20. The motion of the suction drum 18 with respect to the outer cage 20 is measured by the instrumented leaf springs 22. It should be apparent to those of skill in the art that the arrangement in FIG. 3 including three instrumented leaf springs 22 will be sufficient to pinpoint the location of the suction drum 18 with respect to the outer cage 20 thereby indicating the location of a leak that generated a suction pressure. It is preferred that the suction drum 18 be manufactured to be neutrally buoyant and to have a smooth active surface. Alternatively multiple smooth dimples may be provided on the surface of the suction drum 18 to maximize the suction force whenever the suction drum 18 is in the vicinity of a leak. The suction drum 18 material is substantially rigid so that the whole suction drum 18 will move in the presence of a pressure gradient created locally by a leak. Note that the instrumented leaf springs 22 will provide a centering or homing force to maintain the suction drum 18 in a home position with respect to the outer cage 20.

The device disclosed herein may be used to plug a leak in addition to locating a leak. In this mode, the constraining mechanism is switched off so that the suction drum 18 can contact the pipe wall 24. In the case of a leak, the suction drum 18 will then be sucked toward the leak and will cover and plug the leak. This aspect is useful to locate and temporarily plug a leak until a maintenance crew can more permanently fix it.

It should be recognized that the leak detection system of the invention can be supported either by the locomotive 26 or by three or more wheels to facilitate motion inside water pipes and to insure positional stability at every position along the axis of the pipe. Wheels can also help to move the system when the pipes have scale build-up on the pipe walls.

Figure 6:
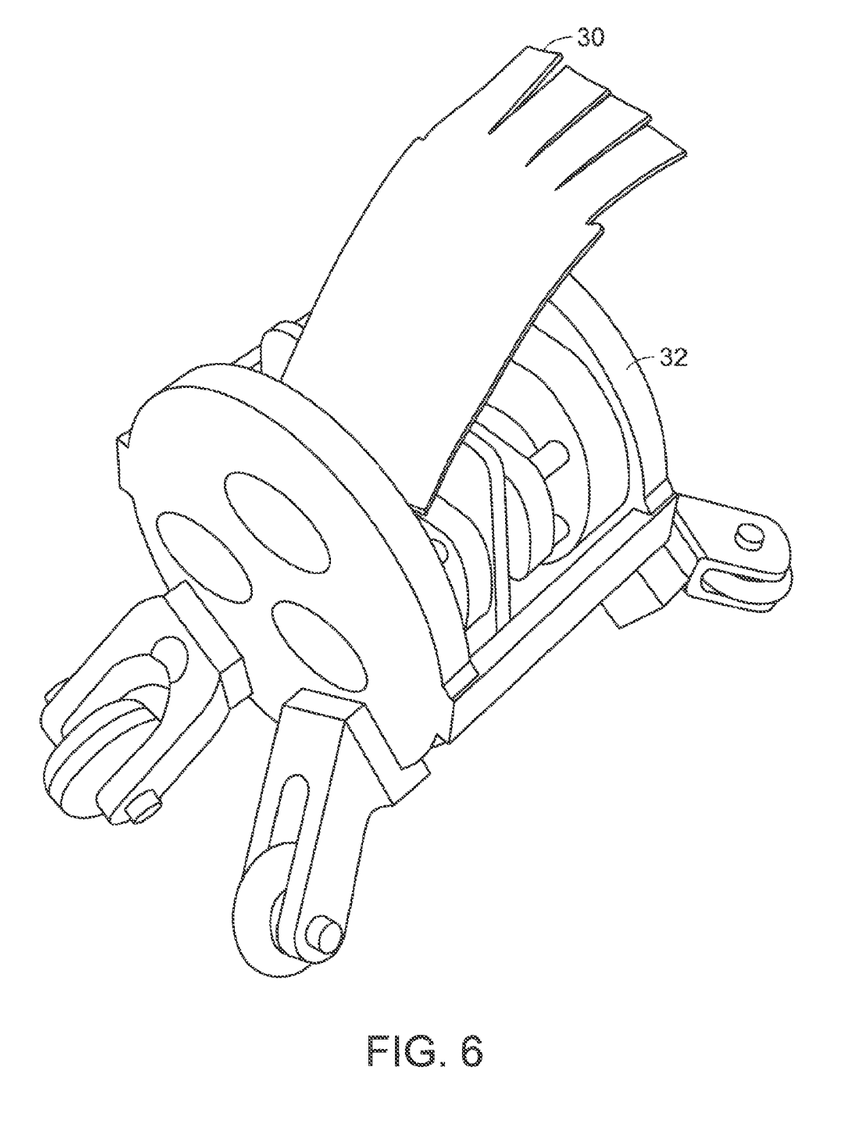
FIG. 6 is a photograph of another embodiment of the invention using force sensing.

Another embodiment (preferred one) of the invention is shown in FIG. 6. In this embodiment, a flexible leaf 30 extends resiliently from a structure 32, In this embodiment, a pressure gradient resulting from a leak will cause the flexible leaf 30 to come into contact with the pipe wall 26. The contact in turn creates a frictional force in the axial direction. The leaf 30 is attached to a force sensor (not shown) which will be responsive to an increase in pressure as a result of the leaf 30 contacting the pipe wall 24. The suction force, and in turn the frictional force, can be lamely augmented by an octopus-like surface on the leaf 30 to increase the signal-noise ratio thereby providing a more reliable leak detection system.

Figure 7:
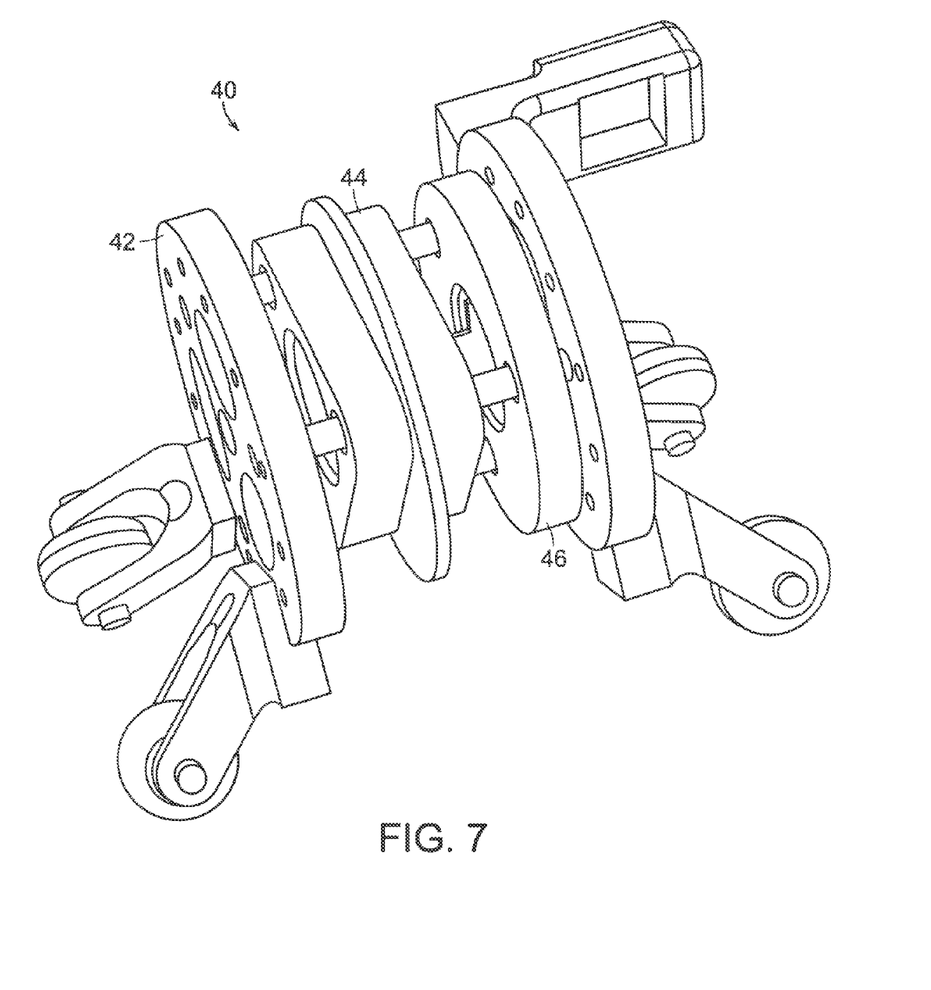
FIG. 7 is a perspective view of another embodiment of the invention using force sensing.
Figure 8:
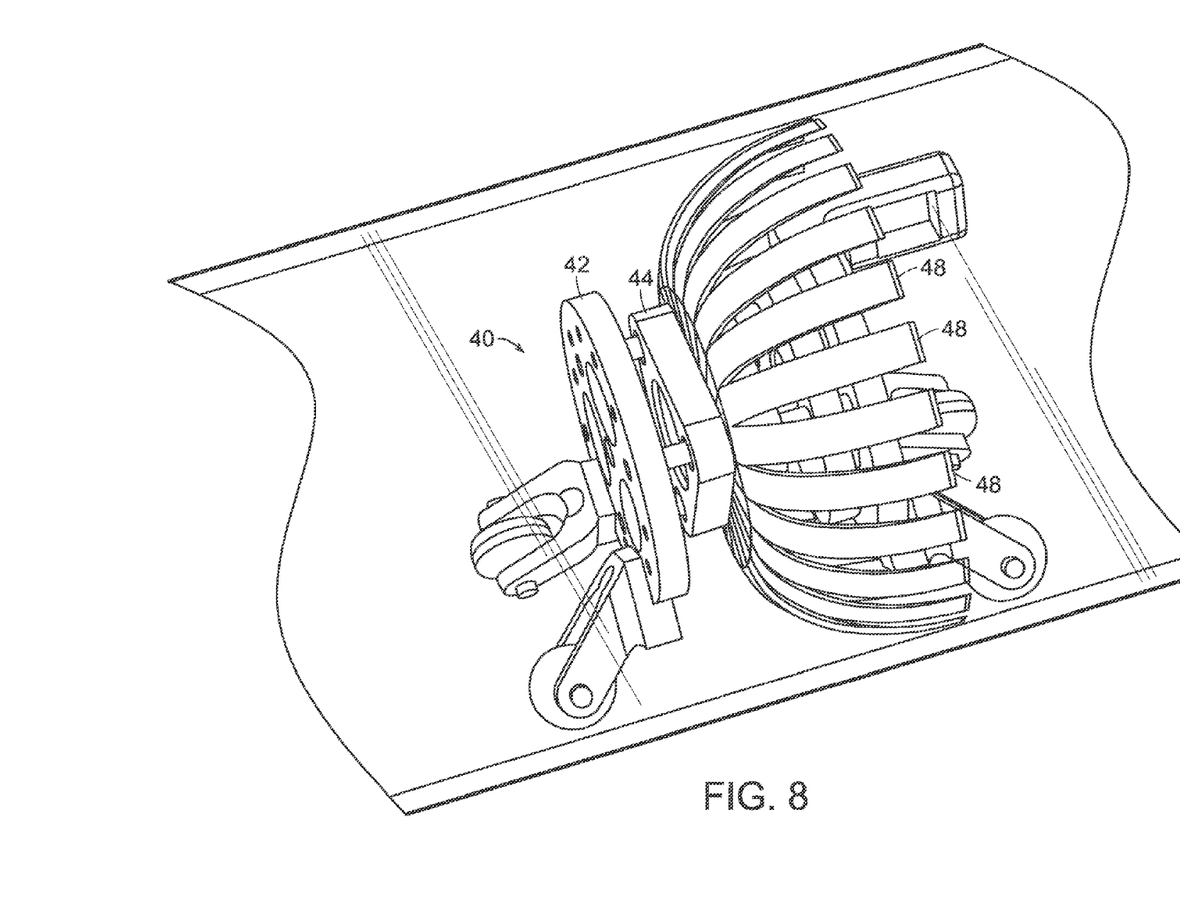
FIG. 8 is a perspective view of the embodiment shown in FIG. 7 showing multiple suction leaves.
Figure 9:
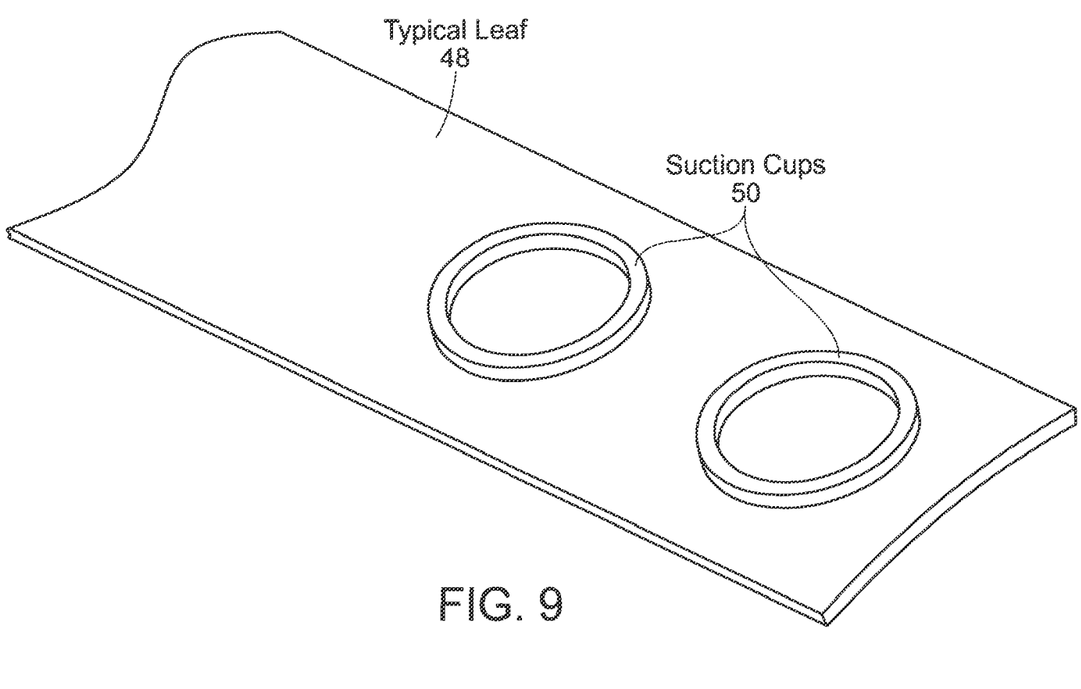
FIG. 9 is a perspective view of suction cups affixed to the leaves in FIG. 8.

With reference now to FIGS. 7 and 8, a locomotive 40 includes a chassis 42 supporting a drum 44 that is slidingly supported with respect to a sensor pad 46. As can be seen in FIG. 8 leaves 48 extend from the drum 44 and are sized to come into contact with the wall of a pipe. As the locomotive 40 moves along the pipe, the leaves 48 will be sucked toward the pipe wall at a leak location. Once the leaves 48 touch the walls, friction between the leaf covering the leak and the wall is generated. As the locomotive 40 moves forward the axial force on the leaf 48 is transferred through the leaf 48 to the drum 44. The drum 44 will then move with respect to the sensor pad 46 which indicates the presence of a leak. As shown in FIG. 9, suction cups 50 are affixed to the leaves 48 to magnify the suction force generated by the suction pressure acting on a typical leaf 48. It was discovered by numerical analysis and prototype testing that adding the suction cups 50 can magnify the suction force by 10 to 15 times. This effect is very helpful in cases where the adhesion between the leaf 48 and pipe 10 is not strong enough to create sufficiently large suction forces.

An algorithm takes the information from the sensors to determine the orientation of the drum relative to the pipe. The algorithm provides the exact position of the leak around the circumference of the pipe. In the event, of a leak, the system can provide an alarm signal transmitted, for example, by a wireless transmitter to a receiving station to inform the authorities of the occurrence of a leak. The force-based leak detection system disclosed herein can be introduced into a pipe network and retrieved after use. For example, the use of a double-gated port valve can be easily integrated into a pipe network or fire hydrants. The present detection system can also be used for pressurized pipes with no ambient water flow for leak detection. In this case, the locomotive 26 has a propeller activated remotely to move the leak detection system along the pipeline.

It is recognized that modifications and variations of the invention disclosed herein will be apparent to those of ordinary skill in the art and it is intended that all such modifications and variations be included within the scope of the appended claims.

The numbers in brackets refer to the references listed herein. The contents of all of these references are incorporated herein by reference.

References

[1] IDA, International Desalination Association, Inventory report, 2001.

[2] IRIN, News website, WWW.osisoft.com, October 2007.

[3] Hunaidi, O. and Chu, W. T., 1999, "Acoustical Characteristics of Leak Signals in Plastic Distribution Pipes", Applied Acoustics, 58:235-254.
[4] Kurtz, D. W., 2006. Pure Technologies US Inc., Central Regional Office, 7107, Lavendale Avenue, Dallas, Tex., 2006.
[5] Yang, J., Wen. Y. and Li, P., 2008, Leak location using blind system identification in water distribution pipelines, Journal of sound and vibration, 310(1-2):134-148.
[6] Patent disclosure by Atia et al 2010.
[7] Internal Research report, Ben-Mansour et al, 2009.

What is claimed is:

1. Leak detection system comprising:
a rigid body resiliently supported within an outer cage by leaf springs; and means for detecting displacement of the rigid body with respect to the outer cage, the displacement indicating a leak when the rigid body is moved by a suction force venerated by a local pressure gradient resulting from a leak within a pipe network wherein the leaf springs include transducers responsive to leaf spring deflection thereby producing a signal proportional to the rigid body motion with respect to the outer cage.

2. The system of claim 1 wherein the transducers are strain gauges.

3. Leak detection system comprising:
a rigid body resiliently supported within an outer cage; and
means for detecting displacement of the rigid body with respect to the outer cage, the displacement indicating a leak when the rigid body is moved by a suction force generated by a local pressure gradient resulting from a leak within a pipe network wherein the outer cage is supported for axial motion along the pipe network.

4. The system of claim 3 wherein the outer cage is supported by a locomotive device for moving the cage along the pipe network.

5. The system of claim 4 wherein the locomotive device is supported by wheels in contact with an inner surface of a pipe within the pipe network.

6. Leak detection system comprising;
a rigid body resiliently supported within an outer cage; and
means for detecting displacement of the rigid body with respect to the outer cage, the displacement indicating a leak when the rigid body is moved by a suction force generated by a local pressure gradient resulting from a leak within a pipe network wherein the rigid body is donut-shaped.

7. Leak detection system comprising:
a rigid body resiliently supported within an outer cage; and
means for detecting displacement of the rigid body with respect to the outer cage, the displacement indicating a leak when the rigid body is moved by a suction force generated by a local pressure gradient resulting from a leak within a pipe network wherein the rigid body has pressure encapsulating suction cups on its surface to enhance the suction force.

8. Leak detection system comprising:
a rigid body resiliently supported within an outer cage; and
means for detecting displacement of the rigid body with respect to the outer cage, the displacement indicating a leak when the rigid body is moved by a suction force generated by a local pressure gradient resulting from a leak within a pipe network further including means for constraining the rigid body for radial motion only with respect to the outer cage.

9. The system of claim 8 wherein the means for constraining the rigid body for radial motion only includes a pin and groove arrangement.

10. Leak detection system comprising:
structure supported for travel along a pipe in an axial direction;
a flexible leaf supported by the structure, the leaf attached to a force sensor;
wherein a suction pressure resulting from a leak in the pipe will cause the leaf to contact the pipe wall generating a force on the leaf that is detected by the force sensor.

11. The system of claim 10 including multiple leaves.

12. The system of claim 11 wherein the leaves are attached to a drum supported for movement with respect to a sensor pad, wherein movement of the drum is detected by the sensor pad to indicate the presence of a leak.

13. The system of claim 10 or claim 11 wherein the leaves are equipped with pressure-encapsulating suction cups to augment the suction forces when needed.

* * * * *